United States Patent
Son et al.

(10) Patent No.: US 8,737,064 B2
(45) Date of Patent: May 27, 2014

(54) ELECTRONIC DEVICE STAND

(75) Inventors: Sung Ho Son, Bellevue, WA (US);
Gregory G. Jones, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 109 days.

(21) Appl. No.: 12/771,937

(22) Filed: Apr. 30, 2010

(65) Prior Publication Data

US 2011/0170244 A1     Jul. 14, 2011

Related U.S. Application Data

(60) Provisional application No. 61/294,415, filed on Jan. 12, 2010.

(51) Int. Cl.
*G06F 1/16* (2006.01)
*H05K 5/00* (2006.01)
*H05K 7/00* (2006.01)

(52) U.S. Cl.
USPC ............................. 361/679.59; 361/679.55

(58) Field of Classification Search
USPC ............ 361/679.02, 679.21, 679.26–679.3, 361/679.4–679.45, 679.55–679.59; 439/11, 439/31, 640
See application file for complete search history.

(56) References Cited

U.S. PATENT DOCUMENTS

| | | | |
|---|---|---|---|
| 2,416,976 A | | 3/1947 | Barbieri |
| 5,494,447 A | * | 2/1996 | Zaidan ............................ 439/31 |
| 5,583,744 A | * | 12/1996 | Oguchi et al. ........... 361/679.58 |
| 5,901,035 A | * | 5/1999 | Foster et al. ............. 361/679.55 |
| 5,927,673 A | | 7/1999 | Kurokawa et al. |
| 6,213,782 B1 | * | 4/2001 | Derstine ......................... 439/31 |
| D444,788 S | * | 7/2001 | Do et al. ................... D14/480.6 |
| 6,357,704 B1 | | 3/2002 | Katoh et al. |
| 6,366,672 B1 | * | 4/2002 | Tsay ............................. 379/446 |
| 6,544,075 B1 | * | 4/2003 | Liao ............................. 439/638 |
| 6,695,620 B1 | * | 2/2004 | Huang ............................ 439/11 |
| 6,722,892 B1 | * | 4/2004 | Blakelock ....................... 439/31 |
| 6,786,734 B2 | * | 9/2004 | Yu .................................. 439/11 |
| 6,786,743 B2 | * | 9/2004 | Huang .......................... 439/131 |
| 6,788,527 B2 | * | 9/2004 | Doczy et al. ............. 361/679.11 |
| 6,856,506 B2 | * | 2/2005 | Doherty et al. .......... 361/679.27 |
| 6,893,267 B1 | * | 5/2005 | Yueh ................................ 439/8 |

(Continued)

FOREIGN PATENT DOCUMENTS

JP     3155573 U     11/2009

OTHER PUBLICATIONS

"Desk Genie Non-Slip Charging Desk Stand", http://www.mobilefun.co.uk/desk-genie-non-slip-charging-desk-stand-p22432.htm, visited Jan. 28, 2010, 5 pp.

(Continued)

*Primary Examiner* — Adrian S Wilson
(74) *Attorney, Agent, or Firm* — Judy Yee; Micky Minhas

(57) ABSTRACT

An electronic device stand comprises mechanically coupled first and second members. The stand is couplable to an edge of an electronic device. The first and second members rotate relative to each other, thus changing a viewing angle for the electronic device. The stand transmits data and power to and/or from the electronic device. This can allow the stand to be used to synchronize data between the electronic device and a support device. In some cases, the stand is detected as being coupled to the electronic device, and one or more applications are executed on the device as a result of the detection.

18 Claims, 8 Drawing Sheets

(56) References Cited

U.S. PATENT DOCUMENTS

| | | | |
|---|---|---|---|
| 6,908,324 B1 * | 6/2005 | Morley et al. | 439/218 |
| 6,991,467 B1 * | 1/2006 | Cheng et al. | 439/10 |
| 7,016,181 B2 * | 3/2006 | Ito et al. | 361/679.31 |
| 7,094,059 B2 * | 8/2006 | Obermeyer | 439/6 |
| 7,121,852 B2 * | 10/2006 | Ng et al. | 439/131 |
| 7,172,428 B2 * | 2/2007 | Huang | 439/11 |
| 7,364,473 B2 * | 4/2008 | Ohta | 439/694 |
| 7,374,425 B1 * | 5/2008 | Kuo et al. | 439/31 |
| D572,249 S * | 7/2008 | Yang | D14/435.1 |
| D586,809 S * | 2/2009 | Jones et al. | D14/435.1 |
| 7,540,466 B2 | 6/2009 | Yang | |
| 7,566,033 B2 * | 7/2009 | Schwager et al. | 248/125.9 |
| 7,599,181 B2 * | 10/2009 | Chuang et al. | 361/679.55 |
| 7,607,950 B2 * | 10/2009 | Liao | 439/638 |
| 7,620,176 B2 | 11/2009 | Gullickson et al. | |
| 7,736,189 B2 * | 6/2010 | Chan et al. | 439/640 |
| 7,744,423 B2 * | 6/2010 | Funahashi | 439/638 |
| 7,766,660 B1 * | 8/2010 | Chang | 439/11 |
| 7,771,239 B1 * | 8/2010 | Hsiao | 439/640 |
| 7,810,222 B2 * | 10/2010 | Ward et al. | 29/410 |
| 7,811,136 B1 * | 10/2010 | Hsieh et al. | 439/640 |
| D629,805 S * | 12/2010 | Nysen et al. | D14/433 |
| 7,929,291 B2 * | 4/2011 | Park et al. | 361/679.41 |
| 7,929,298 B2 * | 4/2011 | Hsu | 361/679.59 |
| 7,933,118 B2 * | 4/2011 | Chiu et al. | 361/679.44 |
| 2001/0022719 A1 * | 9/2001 | Armitage et al. | 361/681 |
| 2002/0163780 A1 * | 11/2002 | Christopher | 361/686 |
| 2003/0095380 A1 * | 5/2003 | Chen et al. | 361/686 |
| 2003/0125075 A1 | 7/2003 | Klovborg | |
| 2004/0066611 A1 * | 4/2004 | Wu | 361/680 |
| 2004/0066614 A1 * | 4/2004 | Hong | 361/683 |
| 2004/0105329 A1 * | 6/2004 | Lin et al. | 365/202 |
| 2005/0111308 A1 | 5/2005 | Hosey | |
| 2005/0181756 A1 * | 8/2005 | Lin | 455/344 |
| 2005/0213298 A1 * | 9/2005 | Doherty et al. | 361/683 |
| 2006/0050471 A1 * | 3/2006 | Chen | 361/681 |
| 2006/0059289 A1 * | 3/2006 | Ng et al. | 710/305 |
| 2006/0250767 A1 | 11/2006 | Brophy et al. | |
| 2007/0141918 A1 * | 6/2007 | Ohta | 439/694 |
| 2007/0174645 A1 * | 7/2007 | Lin | 713/322 |
| 2007/0254729 A1 | 11/2007 | Freund | |
| 2008/0016276 A1 * | 1/2008 | Hong | 711/115 |
| 2008/0094792 A1 * | 4/2008 | Chen et al. | 361/681 |
| 2008/0232044 A1 * | 9/2008 | Moscovitch | 361/681 |
| 2008/0232054 A1 * | 9/2008 | Chen et al. | 361/681 |
| 2008/0248672 A1 * | 10/2008 | Yip | 439/300 |
| 2008/0276099 A1 * | 11/2008 | Nguyen et al. | 713/186 |
| 2008/0288701 A1 * | 11/2008 | Ward et al. | 710/303 |
| 2009/0025266 A1 | 1/2009 | Lambert | |
| 2009/0129010 A1 * | 5/2009 | Park et al. | 361/679.56 |
| 2009/0143100 A1 * | 6/2009 | Champion | 455/556.2 |

OTHER PUBLICATIONS

"Hands Free Mobile Stand to Watch Movies While Flying!", http://www.vhxn.com/hands-free-mobile-stand-to-watch-movies-while-flying, Jan. 18, 2009, 5 pp.

"iZel Innovative Hands-free Stand for iPhone, iPod, Blackberry, Zune", http://www.amazon.com/iZel-Innovative-Hands-free-Stand-for-iPhone-iPod-Blackberry-Zune/dp/B001DUAQTQ/ref=sr_1_1?ie=UTF8&s=electronics&qid=1272048446&sr=8-1, visited Jan. 27, 2010, 5 pp.

"Sony Ericsson Satio Sync & Charge Desk Stand", http://www.mobilefun.co.uk/sony-ericsson-satio-sync-charge-desk-stand-p22153.htm visited Jan. 27, 2010, 2 pp.

"The iBend Stand for iPhone and iPod Touch Review", http://the-gadgeteer.com/2009/08/14/the-ibend-stand-for-iphone-and-ipod-touch-review, Aug. 14, 2009, 6 pp.

Office Action for related Chinese Patent Application No. 201110022567.5, 6 pages, dated Aug. 1, 2012 (with an English translation).

Office Action for related Chinese Patent Application No. 201110022567.5, 9 pages, dated Jan. 4, 2013 (with an English translation).

Office Action for related Chinese Patent Application No. 201110022567.5, 6 pages, dated Apr. 12, 2013 (with an English translation).

Office Action for related Chinese Patent Application No. 201110022567.5, 11 pages, dated Sep. 16, 2013 (with an English translation).

* cited by examiner

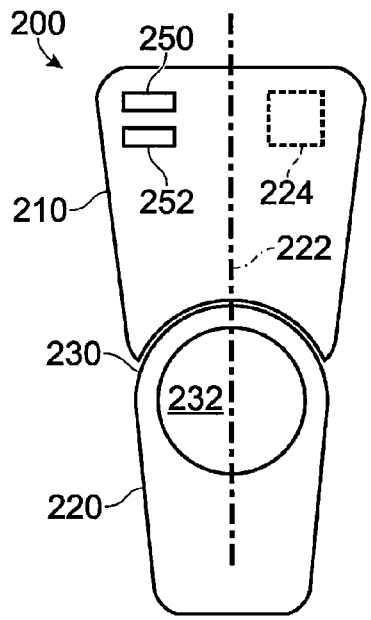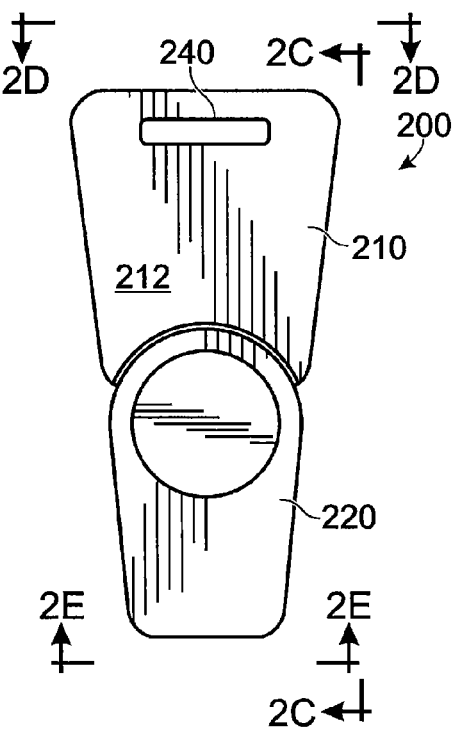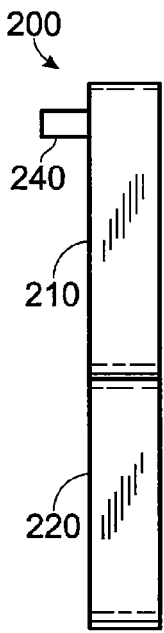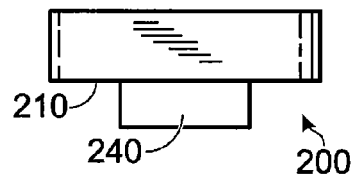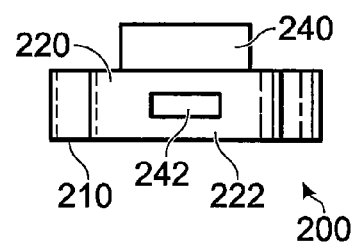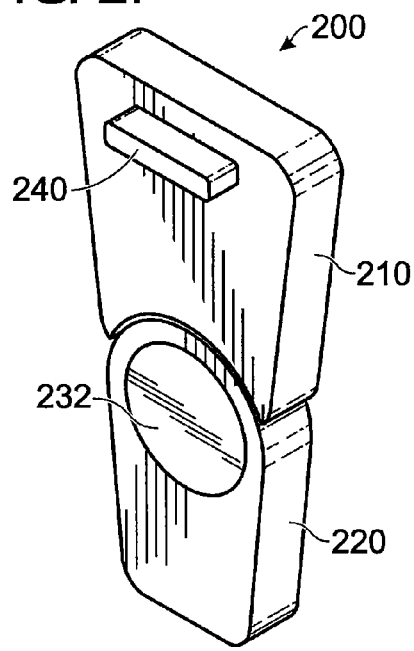

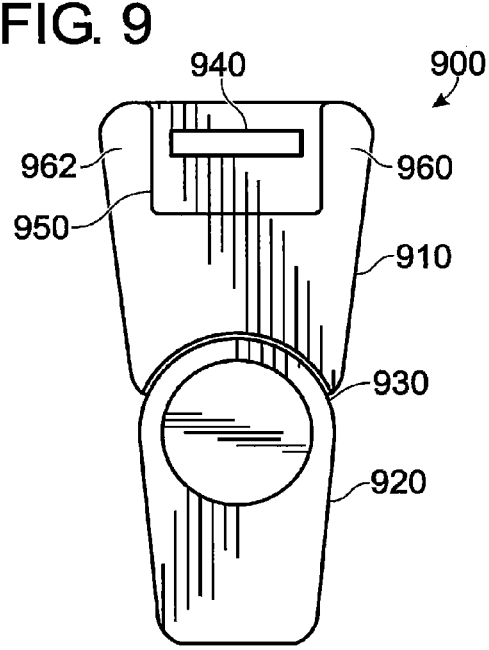
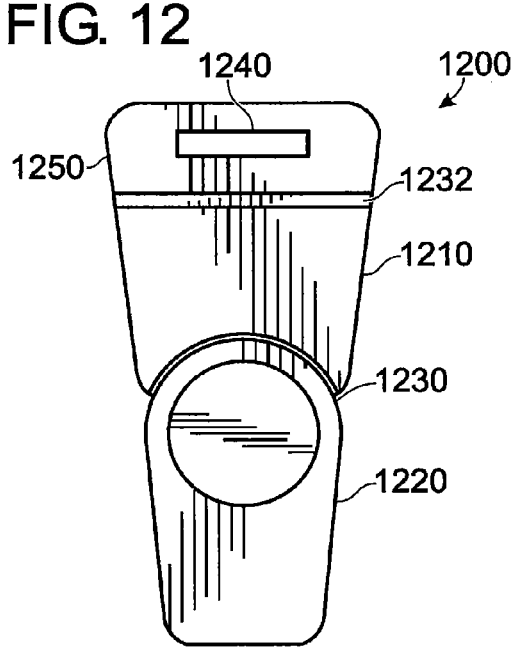
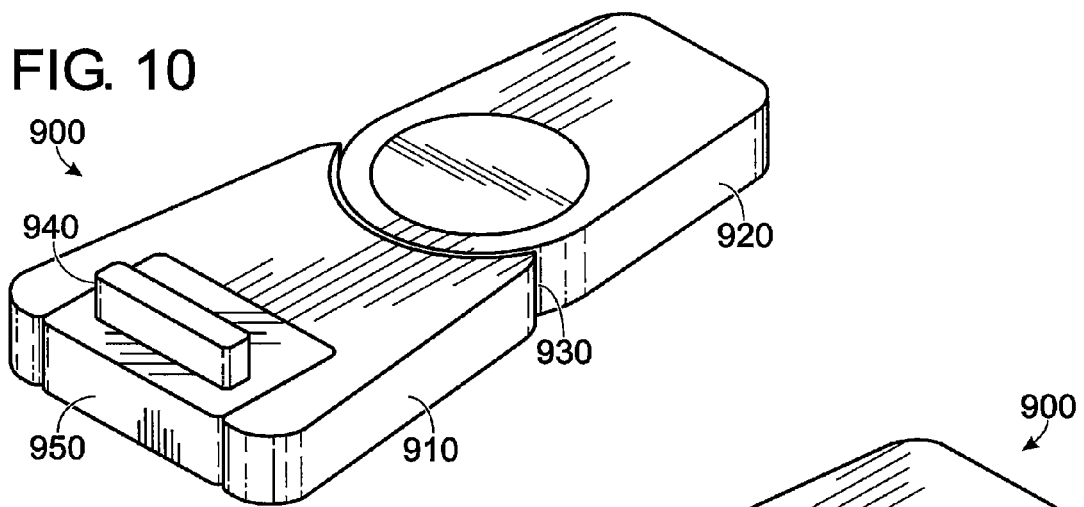
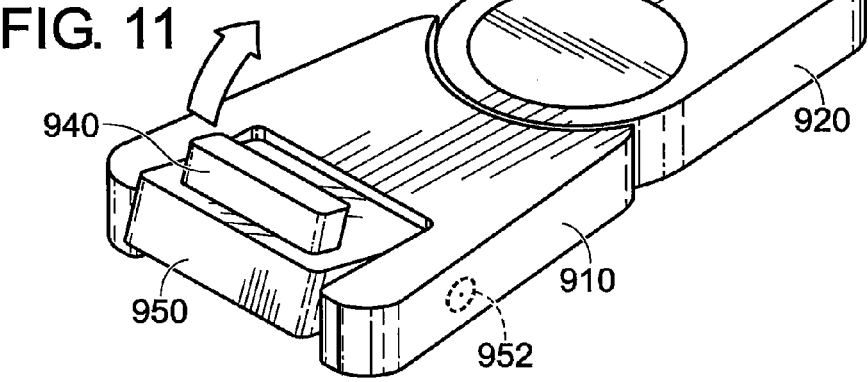

ELECTRONIC DEVICE STAND

CROSS-REFERENCE TO RELATED APPLICATION

This application claims the benefit of U.S. Provisional Application No. 61/294,415, titled "ELECTRONIC DEVICE STAND" and filed Jan. 12, 2010, which is incorporated herein by reference.

FIELD

The disclosed technologies generally relate to stands, battery chargers and/or data connectors for electronic devices.

BACKGROUND

To view content on an electronic device, a user in at least some cases holds or positions the device such that one or more displays on the device can be seen by the user. Such holding or positioning of the device can be inconvenient or tiresome.

SUMMARY

At least some embodiments of an electronic device stand comprise mechanically coupled first and second members. The stand is couplable to a side edge of an electronic device. The first and second members can be rotated relative to each other, thus changing a viewing angle for the electronic device. The stand is electrically couplable to the device to provide power to the device (e.g., for operating the device and/or for charging a battery coupled to the device). In some cases, the stand is also used to transmit data to and/or from the electronic device. This allows the stand to be used to synchronize data between the electronic device and a support device. In some cases, the stand is detected as being coupled to the electronic device, and one or more applications are executed on the device as a result of the detection.

In some embodiments, a hinged support arm for supporting a handheld electronic device in a desired orientation comprises: a first rigid arm member; a second rigid arm member pivotally connected to the first rigid arm member; a first connector located at or adjacent to a first end of the hinged support arm, the first connector being configured to electrically and mechanically couple the hinged support arm to the handheld electronic device and to provide one or more of power or data to the handheld electronic device; and a second connector located at or adjacent to a second end of the hinged support arm, the second end of the hinged support arm being opposite the first end of the hinged support arm, the second connector being configured to electrically couple the hinged support arm to a power source or to another electronic device. The longest axis of the first rigid arm member defines a longitudinal axis, the handheld electronic device includes a display, and the first connector is oriented such that the display of the handheld electronic device is oriented normal to or substantially normal to the longitudinal axis when the handheld electronic device is coupled to the first connector. In some cases, the first connector forms the only area of contact between the handheld electronic device and the support arm when the handheld electronic device is coupled to the first connector.

In additional embodiments, an apparatus comprises: a first member, the first member being mechanically couplable to a non-horizontal edge of an electronic device; a second member, the second member being configurable to engage a support surface for the electronic device, the first and second members being configured to allow at least a portion of the electronic device to engage the support surface when the apparatus is coupled to the electronic device; and a joint rotatably coupling the first member to the second member. The apparatus is configurable to position a viewing surface of the electronic device at one or more viewing angles relative to the support surface. The first member can be configured, when coupled to the electronic device, to extend along an axis that is generally normal to a plane of a viewing surface of the electronic device. The apparatus is configurable, when coupled to the electronic device, to hold the first member above the support surface. The non-horizontal edge of the electronic device comprises a generally vertical edge of the electronic device. In some cases, the first member comprises a first data connector, the first data connector being configurable to electrically couple with a second data connector, the second data connector being electrically coupled to the electronic device. In some cases, the first data connector comprises one or more wireless communication components. The first and second data connectors are configured for use in exchanging data between the electronic device and a companion electronic device. Sometimes the apparatus further comprises a third member, the third member being mechanically coupled to at least the first member or at least the second member, the third member being configurable to engage the support surface. The third member is configured to fold against at least the first member or at least the second member. The apparatus further comprises one or more status indicators.

In yet further embodiments, an apparatus configurable to at least partially support an electronic device on a resting surface comprises: rotatably coupled first and second members, at least the second member being configurable to engage the resting surface for the electronic device; and a third member, the third member being couplable to the electronic device and rotatably coupled to the first member such that at least a portion of the third member is configurable to move outward relative to a plane defined by the first member. In some cases, the first member comprises at least one prong, the third member being rotatably coupled to the at least one prong. In some cases, the first member and the third member are rotatably coupled by at least one joint. The third member is adjustable relative to the first member to change a viewing angle of the electronic device relative to the resting surface. The first member can be an elongated member. The apparatus can also comprise a component configured to cause the electronic device to run one or more applications when the apparatus is coupled to the electronic device.

In further embodiments, a stand for an electronic device comprises a first leg rotatably coupled to a second leg, the first leg being couplable to a data connector on a non-resting edge of the electronic device, an angle between the first leg and the second leg being adjustable such that a user viewing angle for a display on the electronic device is adjustable, the stand being configurable to engage a portion of a resting surface next to the device while exposing a resting edge of the device to the resting surface, the stand being further configurable for use in providing power to the electronic device and for use in transferring data between the electronic device and a computer.

The foregoing and other features of the disclosed technologies will become more apparent from the following detailed description, which proceeds with reference to the accompanying figures.

BRIEF DESCRIPTION OF THE DRAWINGS

FIGS. 2A-2F show views of an exemplary embodiment of a stand.

FIGS. 9-11 show views of another exemplary embodiment of a stand.

FIG. 12 shows a further exemplary embodiment of a stand.

DETAILED DESCRIPTION

Figure 1:
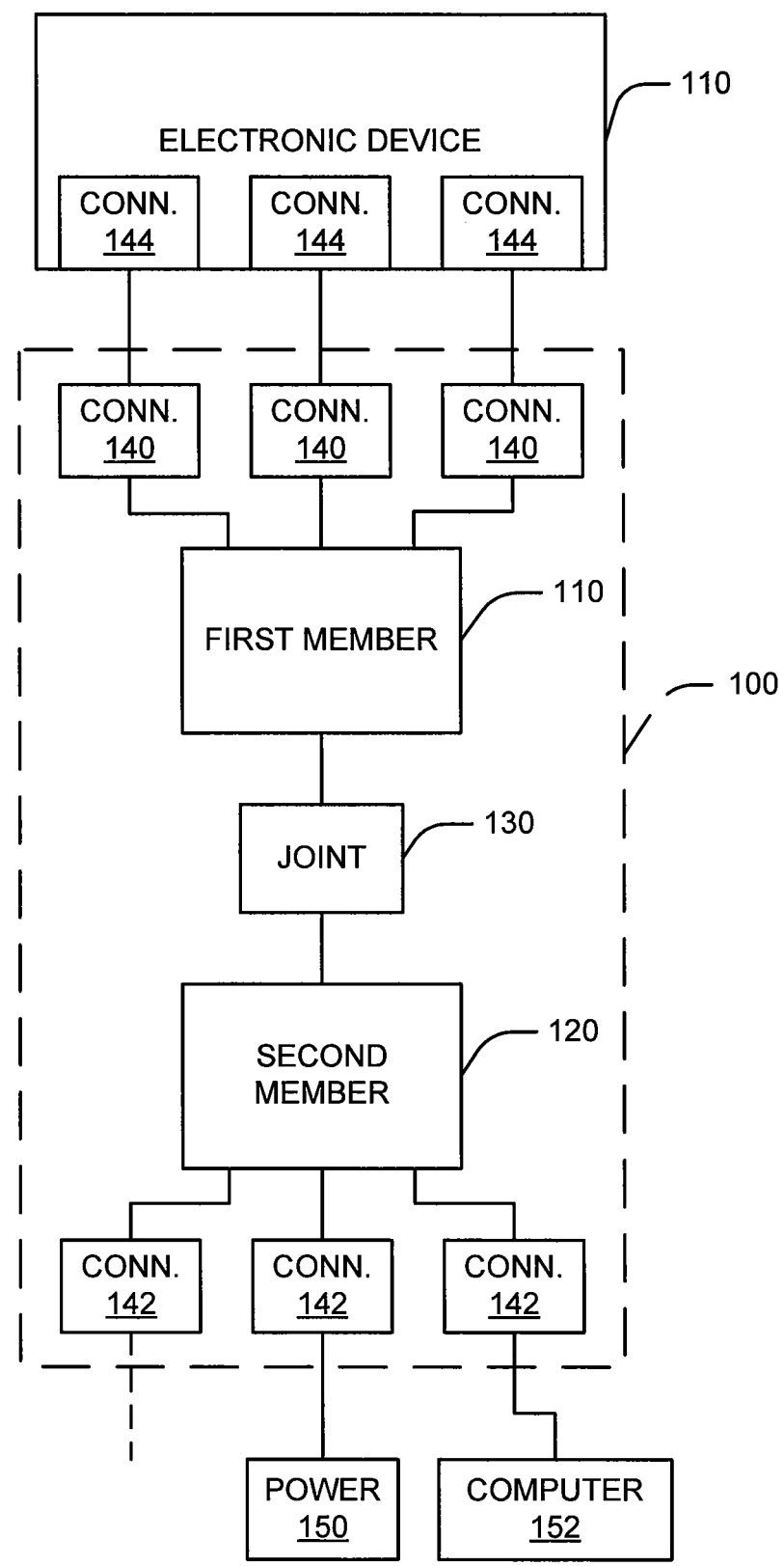
FIG. 1 shows a block diagram of an exemplary embodiment of a stand.

Disclosed below are embodiments of electronic device technologies and/or related systems and methods. The embodiments should not be construed as limiting in any way. Instead, the present disclosure is directed toward all novel and nonobvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "provide" and "transmit" to describe the disclosed technology. These and other terms are high-level abstractions of the actual operations that are performed. The actual operations that correspond to these terms may vary depending on the particular implementation and are readily discernible by one of ordinary skill in the art. Moreover, unless the context dictates otherwise, the term "electrically coupled" means electrically or electromagnetically connected or linked and includes both direct connections or direct links and indirect connections or indirect links through one or more intermediate elements not altering the intended operation of the circuit. Unless the context dictates otherwise, the term "mechanically coupled" means mechanically connected or linked and includes both direct connections or direct links and indirect connections or indirect links through one or more intermediate elements not altering the intended operation of the device. Mechanical coupling and electrical coupling are not mutually exclusive, unless the context dictates otherwise.

Any of the methods described herein can be performed at least in part using software comprising computer-executable instructions stored on one or more non-transitory computer-readable storage media. Computer-readable storage media can include non-volatile storage such as, for example, read-only memory (ROM), flash memory, hard disk drives, floppy disks and optical disks (e.g., CD, DVD). Computer-readable storage media can also include volatile storage such as, for example, random-access memory (RAM), device registers and processor registers.

Computer-executable instructions can be executed within a local or distributed computing environment. For clarity, only certain selected aspects of the software-based implementations are described. Other details that are well known in the art are omitted. For example, it should be understood that the disclosed technologies are not limited to any specific computer language, program, or computer.

Furthermore, any of the software embodiments (comprising, for example, computer-executable instructions for causing a computer to perform any of the disclosed methods) can be transmitted, received, or accessed through a suitable communication means (e.g., a wired network, a wireless network, the Internet, the World Wide Web).

Exemplary embodiments of electronic devices which can be used with at least some of the disclosed technologies include a computer (e.g., a desktop computer, a laptop computer, a netbook, a server, a thin client), a telephone (e.g., a cell phone, a smartphone, a cordless phone), or a handheld computing device (e.g., a personal digital assistant (PDA), a portable music or video player, a video game device, an electronic book reader). In particular embodiments, two or more such devices are used in combination with one or more of the disclosed technologies. For example, an electronic device such as a display can be electrically and/or mechanically coupled to a computer. At least some embodiments of electronic devices can be configured to receive data from a network and/or transmit data to a network.

FIG. 1 shows a block diagram of an exemplary embodiment of a stand 100, which is mechanically and/or electrically couplable to an electronic device 110. The stand 100 comprises a first member 110 and a second member 120. The first member 110 and the second member 120 are mechanically coupled (e.g., pivotally connected) by a joint (or hinge) 130. In some embodiments, the members 110, 120 are also electrically coupled by the joint 130. One or more connectors 140 are mechanically and/or electrically coupled to the first member 110, and the connectors 140 are mechanically and/or electrically couplable to one or more corresponding connectors 144 in the electronic device 110.

In some embodiments, the second member 120 is mechanically and/or electrically coupled to one or more connectors 142. The connectors 142 are couplable to one or more other components. For example, at least one of the connectors 142 is mechanically and/or electrically couplable to a power source 150 (e.g., for providing power to the stand 100 and/or to the device 110). The power source 150 comprises, for example, a power adapter or another electronic device. In further embodiments, at least one of the connectors 142 is mechanically and/or electrically couplable to another electronic device, such as a computer 152 (e.g., for transmitting data to and/or from the electronic device 110). In some cases, at least one of the connectors 142 is coupled to the first member 110 instead of to the second member 120.

FIG. 2A shows a front view of an exemplary embodiment of a stand 200 for an electronic device. The stand 200 comprises an embodiment of the stand 100, described above. The stand 200 comprises a first member 210 and a second member 220. The members 210, 220 are mechanically coupled by a joint 230. In some cases, the joint 230 also electrically couples the members 210, 220. In the depicted embodiment, the members 210, 220 (which are sometimes called "legs," "portions," "arms" or "arm members") have a generally trapezoidal shape. However, in further embodiments, one or both of the members 210, 220 have one or more other shapes (e.g., generally rectangular, generally circular, generally oval, or another shape). FIG. 2A shows the members 210, 220 as being generally elongated along an axis 222. In further embodiments, one or more of the members 210, 220 are not so elongated. The members 210, 220 are generally rigid, though in some embodiments they can be semi-rigid.

FIG. 2B is a rear view of the stand 200. This view shows a rear surface 212 of the first member 210. The rear surface 212 features a connector 240. In some embodiments, the connector 240 comprises a mechanical connector, a data connector and/or a power connector. The connector 240 is configurable to mechanically and/or electrically couple to one or more portions of an electronic device. In various embodiments, the mechanical connector, for example, fixes at least a portion of the stand 200 in position relative to the electronic device. The mechanical connector mechanically couples with the electronic device using one or more of interlocking portions, magnets, adhesives, or any of a number of other configurations. Although the depicted embodiment of the stand 200 shows the connector 240 protruding from the surface 212, in other embodiments the connector 240 is at least partially recessed into the surface 212, flush with the surface 212, or concealed by the surface 212. Further embodiments comprise additional connectors coupled to the first member 210.

FIG. 2C shows a side view of the stand 200, and FIG. 2D shows a top view of the stand 200. FIG. 2E is a bottom view of the stand 200 and shows a connector 242 coupled to the member 220. In some embodiments, the connector 242 comprises a mechanical connector, a data connector and/or a power connector. FIG. 2E shows the connector 242 as being on a bottom surface 222 of the second member 220. In other embodiments, the connector 242 is positioned on another surface of the stand 200 (e.g., on another surface of the second member 220, or on a surface of the first member 210), or on two or more surfaces of the stand 200. Further embodiments of the stand 200 feature two or more connectors 242, located on one or more surfaces of the stand 200. FIG. 2F shows a perspective view of the stand 200. Although these figures depict the members 210, 220 as having generally rectangular cross-sections, in different embodiments at least one of these components has cross-sections of one or more other shapes.

Any of the connectors described herein, such as the connectors 140, 142, 144, 240, 242, can comprise, for example, a USB-type connector, a power connector, a wireless connector (e.g., Bluetooth, Wi-Fi, near field communication (NFC)), and/or another connector (e.g., optical, High-Definition Multimedia Interface (HDMI), or any custom connector).

Some embodiments of the stand 200 comprise one or more status indicators 250, 252 (see FIG. 2A). The indicators 250, 252 can be positioned anywhere on the stand 200 including, for example, on the first member 210. The indicators comprise, for example, one or more LEDs, LCDs and/or other components that provide a visual indication and/or other type of indication to a user. The indicators 250, 252 show, for example, data connection status, power status, battery status and/or one or more other pieces of information.

Figure 3:
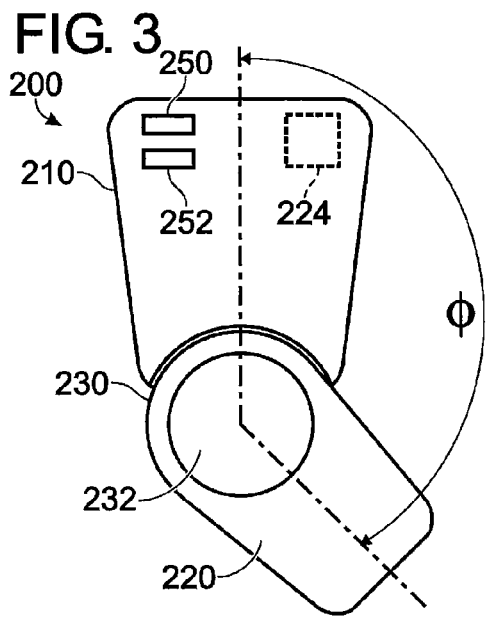
FIG. 3 shows an embodiment of a stand with rotated members.

In some embodiments, the joint 230 rotatably couples the members 210, 220. For example, as shown in FIG. 3, the first member 210 is rotatable to an angle φ relative to the second member 220. The angle φ is selected from within a given range of angles or from a set of one or more predetermined angles. The rotation is performed manually by a user (e.g., by hand) and/or using one or more mechanical devices (e.g., using a motor or other tool). In some embodiments, the first member 210 and the second member 220 rotate relative to each other with one degree of freedom (e.g., they rotate in one plane). In further embodiments, the members 210, 220 are configured to rotate relative to each other with two or more degrees of freedom (e.g., they rotate in two or more planes); in such embodiments, the joint 230 comprises a joint that allows for two or more degrees of freedom (e.g., a ball joint or other joint).

Some embodiments feature one or more locking mechanisms 232 which lock and unlock to control whether the members 210, 220 can rotate relative to each other. In the embodiment of FIG. 3, the locking mechanism 232 comprises a depressable button that controls rotatability. Further embodiments do not have such a locking mechanism.

Figure 4A:
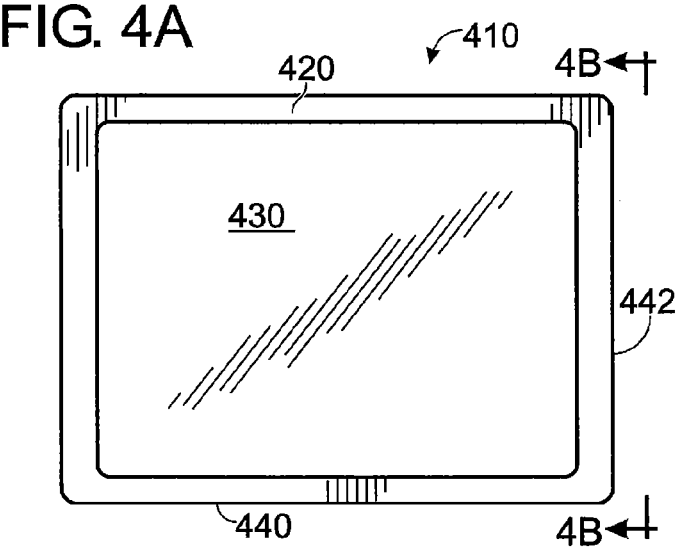
FIGS. 4A-4B show views of an exemplary embodiment of an electronic device.

FIG. 4A shows a front view of an exemplary embodiment of an electronic device 410 that is used with one or more technologies disclosed herein. The device 410 comprises a front surface 420. The perimeter of the device comprises a plurality of edges, such as edges 440, 442. The front surface 420 comprises a display 430. In some cases, the front surface 420 features multiple displays.

In this application and in the claims, terms such as "horizontal" and "vertical" (and variations thereof) are used to describe a given electronic device or portions of the device in relative terms. More particularly, they are applied as the device is intended to be positioned on a resting surface. For example, if the device 410 is intended to be positioned such that the edge 440 rests on a generally horizontal surface, then the edge 440 is a horizontal edge and the edge 442 is a vertical edge. Of course, some devices can be positioned on a resting surface in several different orientations. For such devices, a given edge can be a vertical edge (when the device has one orientation) or a horizontal edge (when the device has another orientation).

The depicted embodiment of the display 430 is shown generally oriented in landscape orientation (e.g., at least one horizontal dimension of the display 430 is larger than the vertical dimensions of the display 430). In landscape orientation, the device 410 is positionable on a resting surface such that a generally horizontal resting edge 440 engages the resting surface. In this orientation, an edge 442 of the device 410 is a non-resting edge that is generally non-horizontal (or less horizontal) relative to the resting edge 440. In further embodiments, the device 410 is configured such that the display 430 is shown generally oriented in portrait orientation (e.g., at least one vertical dimension of the display 430 is larger than the horizontal dimensions of the display 430) or in another orientation.

Figure 4B:
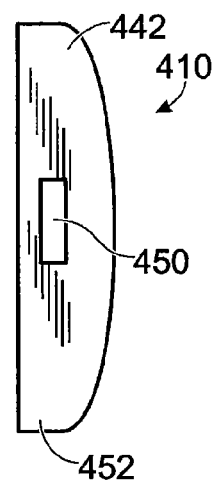

FIG. 4B is a side view of the device 410 showing the edge 442. This view also shows a connector 450. In the depicted embodiment, the connector 450 is positioned approximately in the middle of the edge 442, but in further embodiments the connector 450 is positioned elsewhere (e.g., near a corner, such as a corner 452). Some embodiments of the device 410 comprise multiple connectors, and the connectors are located on a single surface or on multiple surfaces. Different connectors have different functions. For example, a first connector provides a mechanical coupling for a stand, a second connector provides an electrical coupling for data exchange, and a third connector provides an electrical coupling for power. Two or more functions are sometimes combined in one connector. Any of the stands described herein can be configured to couple to one or more connectors on the device 410.

Figure 5:
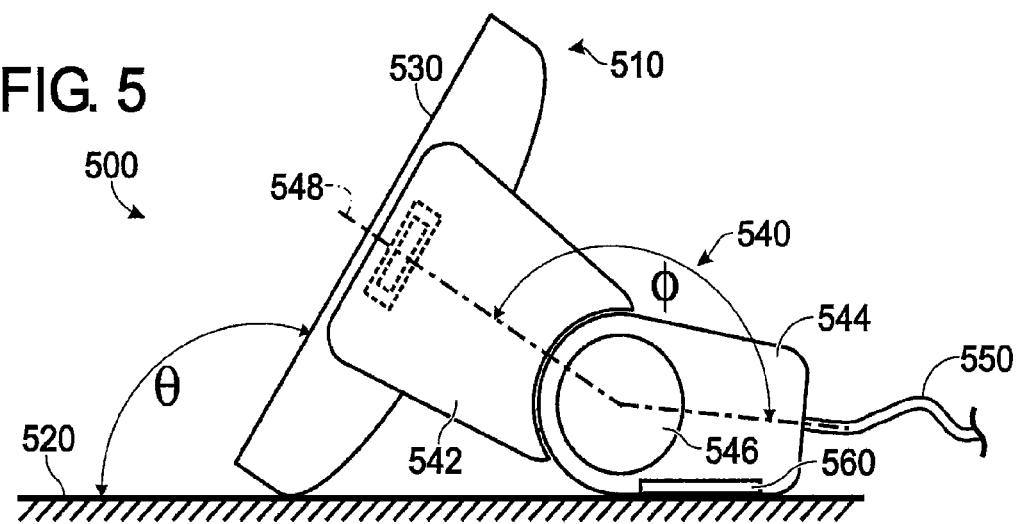
FIG. 5 shows an exemplary configuration of an electronic device and a stand.

FIG. 5 shows an exemplary configuration 500 of an electronic device 510 (similar to, for example, the device 410 described above) at least partially resting on a resting surface 520. The resting surface 520 comprises, for example, one or more of a table, shelf, nightstand, desk, or any other surface where a user may rest an electronic device. The device 510 comprises a display 530 that is positioned at an angle θ relative to the resting surface 520. The device 510 is coupled to a stand 540, which in some cases is similar to the stands 100, 200 described above. The stand 540 comprises a first member 542 and a second member 544, which are connected by a joint 546. In at least some embodiments, and as shown in FIG. 5, the first member 542 is coupled to the device 510 such that the first member 542 generally extends along an axis 548 that is normal or generally normal (e.g., approximately normal) to a plane formed by the display 530.

FIG. 5 shows a cable 550 coupled to the second member 544. In some embodiments, the cable 550 is coupled to the second member 544 through a connector (not shown), similar to the connector 242 described above. The cable 550 can be disconnected from the second member 544. In other embodiments, the cable 550 is hardwired to the second member 544 (e.g., the cable 550 is a "captive cable").

FIG. 5 also shows a third member 560, which provides additional support for the stand 540. The third member 560 is shown coupled to the second member 544, but in further embodiments it is coupled also to the first member 542 or only to the first member 542. The third member 560 is, in some cases, detachably coupled to the second member 544. In some cases, the third member 560 is also configured to fold against another member.

Figure 6:
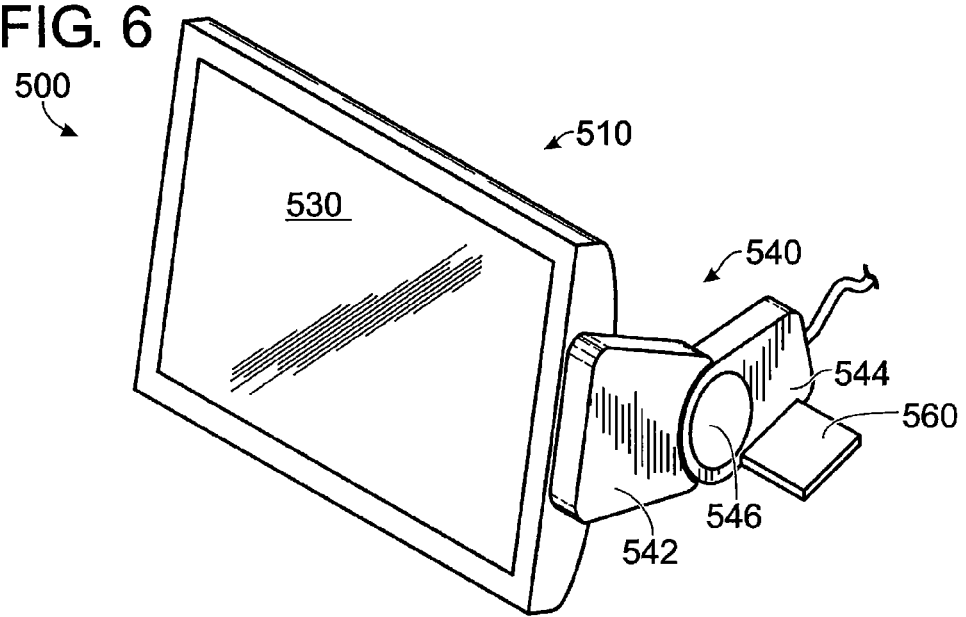
FIG. 6 shows a perspective view of the configuration of FIG. 5.

In the depicted embodiment, the members 542, 544 are positioned at an angle φ relative to each other. In at least some cases, the members 542, 544 are adjustable to change the angle φ. Accordingly, the angle θ can also be adjusted by adjusting the members 542, 544. This can, for example, allow a user to adjust an angle at which he or she is viewing the display 530 (sometimes called a "viewing angle"). FIG. 6 shows a perspective view of the configuration 500.

As can be seen from FIGS. 5 and 6, at least some embodiments of the stand 540 attach to the device 510 such that the stand 540 generally extends toward an area behind the device 510 (relative to the display 530) and/or to the side of the of the device (again, relative to the display 530). Further embodiments of a stand extend to one or more other regions around a coupled electronic device. As can also be seen from FIGS. 5 and 6, at least some embodiments of a stand also allow at least a portion of the device (e.g., at least a portion of a resting edge) to engage or otherwise be exposed to a resting surface. In certain embodiments, a stand does not come between a coupled device and a surface on which the device rests.

Figure 7:
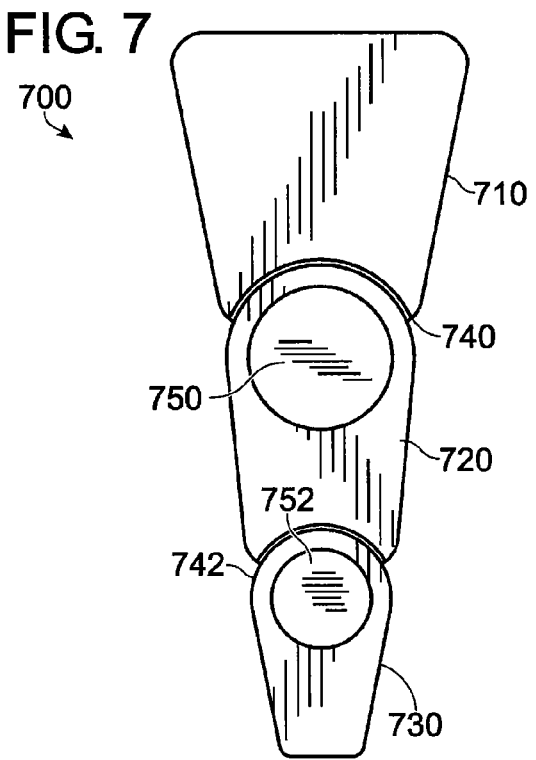
FIG. 7 shows another exemplary embodiment of a stand.

Further embodiments of a stand comprise three or more members (i.e., three or more "legs", "portions" or "arms"). FIG. 7 shows an exemplary embodiment of a stand 700 that comprises a first member 710 coupled to a second member 720 by a joint 740. The second member 720 is coupled to a third member 730 by a joint 742. In some embodiments, each of the members 710, 720, 730 rotate relative to one or more of the other members. Two or more members can be rotated in the same direction, or in different directions. One or both of the joints 740, 742 operate similarly to one or more embodiments of joints described above. In some cases one or both of the joints 740, 742 operate responsive to one or more locking mechanisms 750, 752. The disclosed technologies are not limited to embodiments with two or three members. Instead, at least some embodiments of the disclosed technologies comprise four, five, six or more members.

Figure 8A:
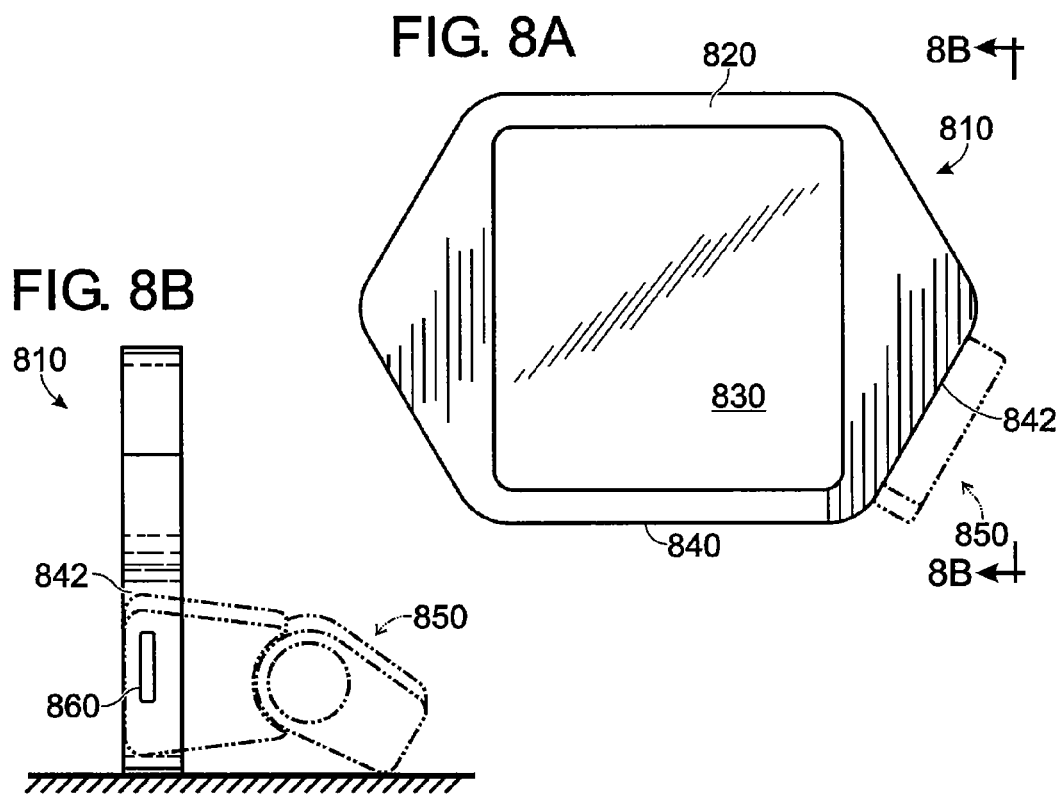
FIGS. 8A-8B show views of an exemplary embodiment of an electronic device and a stand.

FIG. 8A is a front view of another embodiment of an electronic device 810 comprising a front surface 820 with a display 830. The device 810 further comprises at least one resting edge 840 and at least one non-resting edge 842. In the depicted orientation, the resting edge 840 is generally horizontal and the non-resting edge 842 is less horizontal than the resting edge 840. The resting edge 840 can be used to engage a resting surface. The non-resting edge 842 is couplable to a stand 850. In some cases, the stand 850 is similar to one or more of the stands described herein.

Figure 8B:
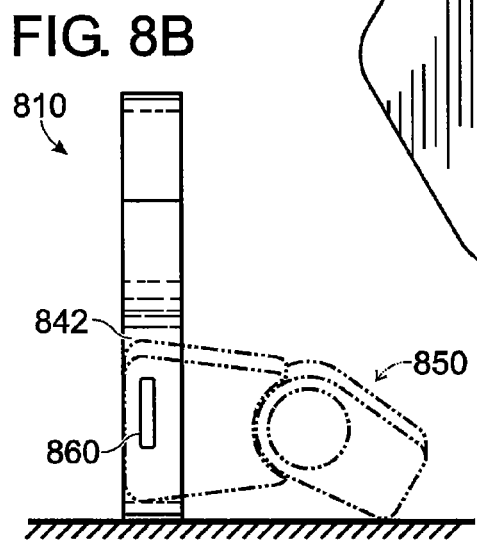

FIG. 8B is a side view of the electronic device 810 that shows a connector 860 on the non-resting edge 842. In the depicted embodiment, the stand 850 is mechanically and/or electronically coupled to the device 810 at least partially using the connector 860. The stand 850 is adjustable (e.g., as described above for one or more other stand embodiments) to change a viewing angle of the display 830.

FIG. 9 shows a view of another embodiment of a stand 900 comprising a first member 910 and a second member 920. The members 910, 920 are coupled by a joint 930. A connector 940 is coupled to a third member 950, and the third member 950 is coupled to the first member 910. In the depicted embodiment, the third member 950 is positioned between two prongs 960, 962 of the first member 910. In further embodiments, other numbers of prongs are present. FIG. 10 shows a perspective view of the stand 900.

In at least some embodiments, the third member 950 is configured to move (e.g., rotate) relative to at least one of the members 910, 920. For example, FIG. 11 shows a perspective view of the stand 900 with the third member 950 rotating in an upward direction (e.g., generally, outward relative to a plane defined by at least one of the members 910, 920) using a joint 952. This also allows the connector 940 to be moved relative to the members 910, 920.

FIG. 12 shows a view of an embodiment of a stand 1200. In this embodiment, a third member 1250 with a connector 1240 is coupled to a first member 1210. The first member 1210 is coupled to a second member 1220 through a joint 1230. Although the third member 1250 is rotatable relative to the first member 1210 (similar to the stand 900, described above), the third member is coupled to the first member 1210 using a joint 1232, instead of using one or more prongs.

Figure 13:
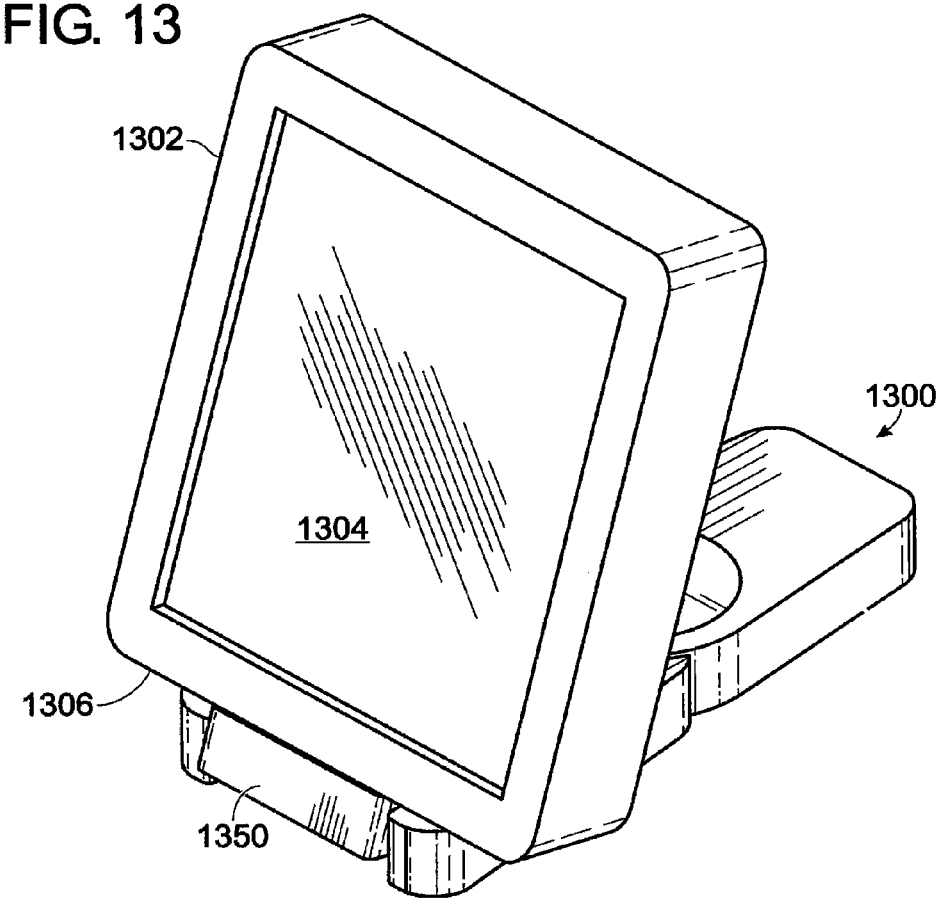
FIGS. 13 and 14 show views of a stand and an electronic device.

FIG. 13 shows a perspective view of an embodiment of a stand 1300 (which in this case is similar to the stand 900) in use with an electronic device 1302. The device 1302 is coupled to a third member 1350 of the stand 1300. A connector 1340 (not shown in this view) on the third member 1350 couples to the device 1302 (e.g., to a corresponding connector on an edge 1306).

Figure 14:
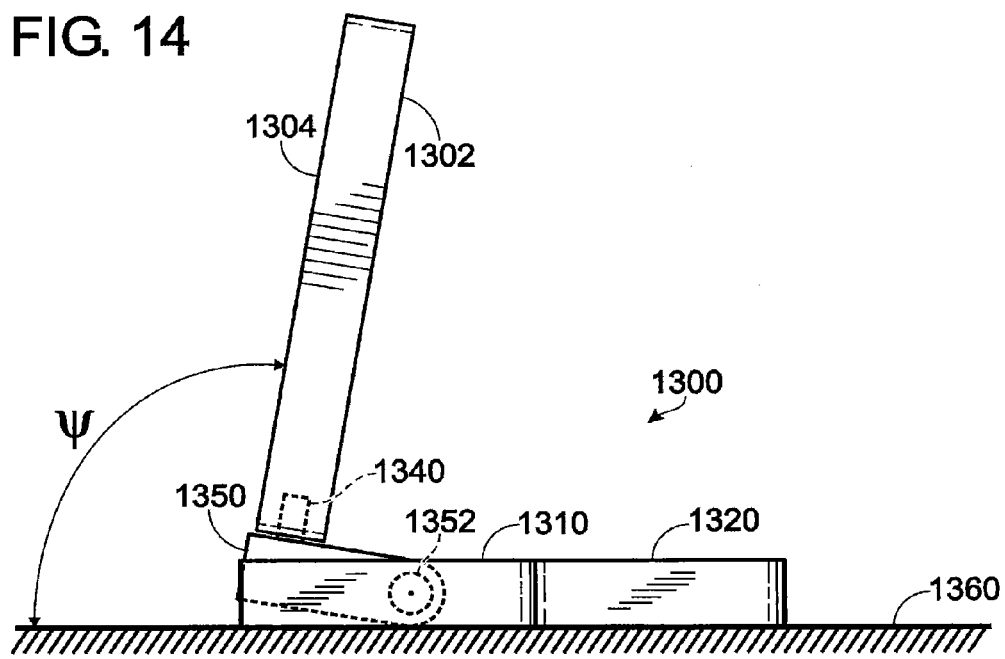

FIG. 14 shows a side view of the configuration depicted in FIG. 13. The third member 1350 is rotatable relative to a first member 1310 and a second member 1320 (e.g., using a joint 1352). Adjusting the position of the third member 1350 can allow for adjusting an angle ψ between the device 1302 and a resting surface 1360. In at least some cases, this allows a user to adjust a viewing angle of a display 1304 on the device 1302. This configuration can, for example, support the device 1302 in a general portrait orientation. Further embodiments support an electronic device in a general landscape orientation.

Embodiments of stands disclosed herein can comprise various materials, including metals, plastics, composites and/or wood. Various techniques can be used to manufacture a stand with one or more such materials (e.g., molding for a plastic, machining a metal or other hard material).

Figure 15:
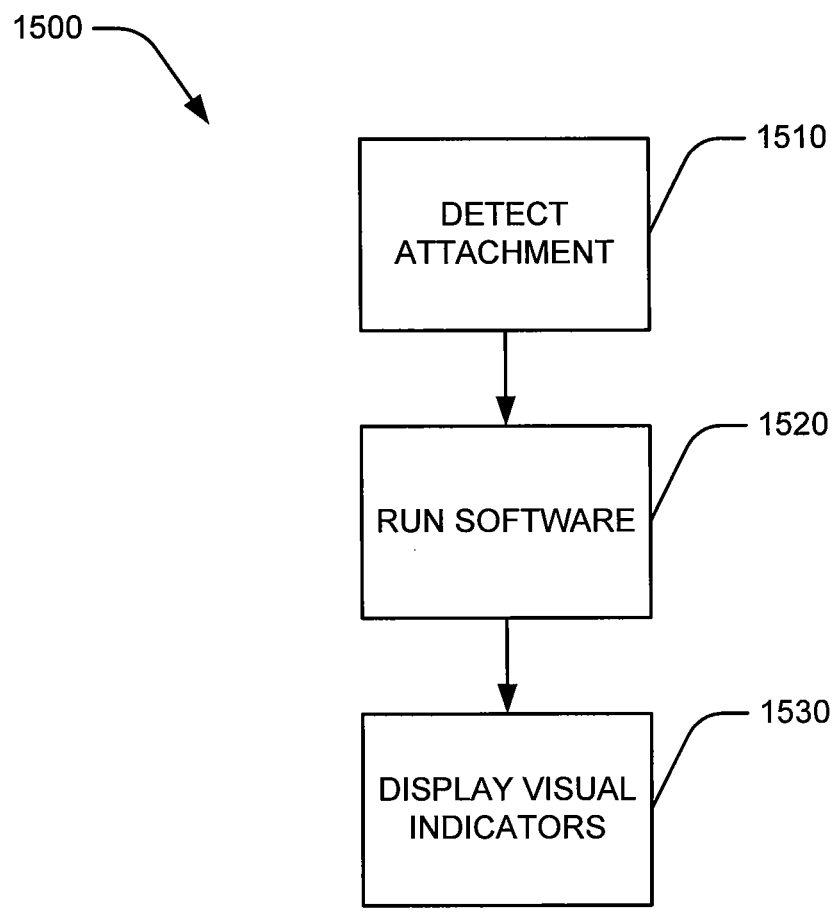
FIG. 15 shows a block diagram of an exemplary embodiment of a method for use with a stand.

One or more embodiments of stands disclosed herein can be used with software on the electronic device. FIG. 15 shows a block diagram of an exemplary embodiment of a method 1500 for use with a stand (e.g., one or more of the stands described above). In a method act 1510, an electronic device support (e.g., a stand) is detected as being attached to an electronic device. In some cases, this detection is performed at least in part using one or more circuits in the stand. Returning briefly to FIG. 2A, an identification circuit 224 is shown in the stand 200. The circuit 224 comprises, for example, one or more microchips and/or other electronic components.

As a result of the detecting, in a method act 1520 one or more software applications are run on the electronic device. In some embodiments, in a method act 1530 one or more visual indicators (e.g., user interface elements such as icons, menus, dialog boxes, and/or buttons), corresponding to at least one of the software applications, are displayed on the electronic device.

In a particular implementation of the method 1500, an electronic device detects that a stand is coupled to the device. For example, the device detects that the stand is coupled to a connector on the device. As a result of the detection, the device displays several icons, each icon corresponding to an application that the device can run. Applications include, for example, a clock (e.g., a desk clock and/or an alarm clock), a picture frame, a weather station, a data synchronizer, and/or a media player (e.g., for playing audio files and/or video files). A user can, for example, select one or more icons to run the corresponding program(s) on the device.

In at least some embodiments, the stand does not hold the electronic device rigidly in a dock, so a user can easily pick up the device while the device is attached to the stand. Some embodiments of the stand are relatively portable compared to other types of device stands. In some cases, the electronic device is usable as a telephone for at least a portion of a time when the stand is mechanically coupled to the device.

In one or more embodiments, the stand is useful to: help power and/or charge an electronic device; help exchange or synchronize data between the device and a companion electronic device (e.g., a personal computer or computer network); position the device at a selected viewing angle; and/or run one or more applications on the device.

Figure 16:
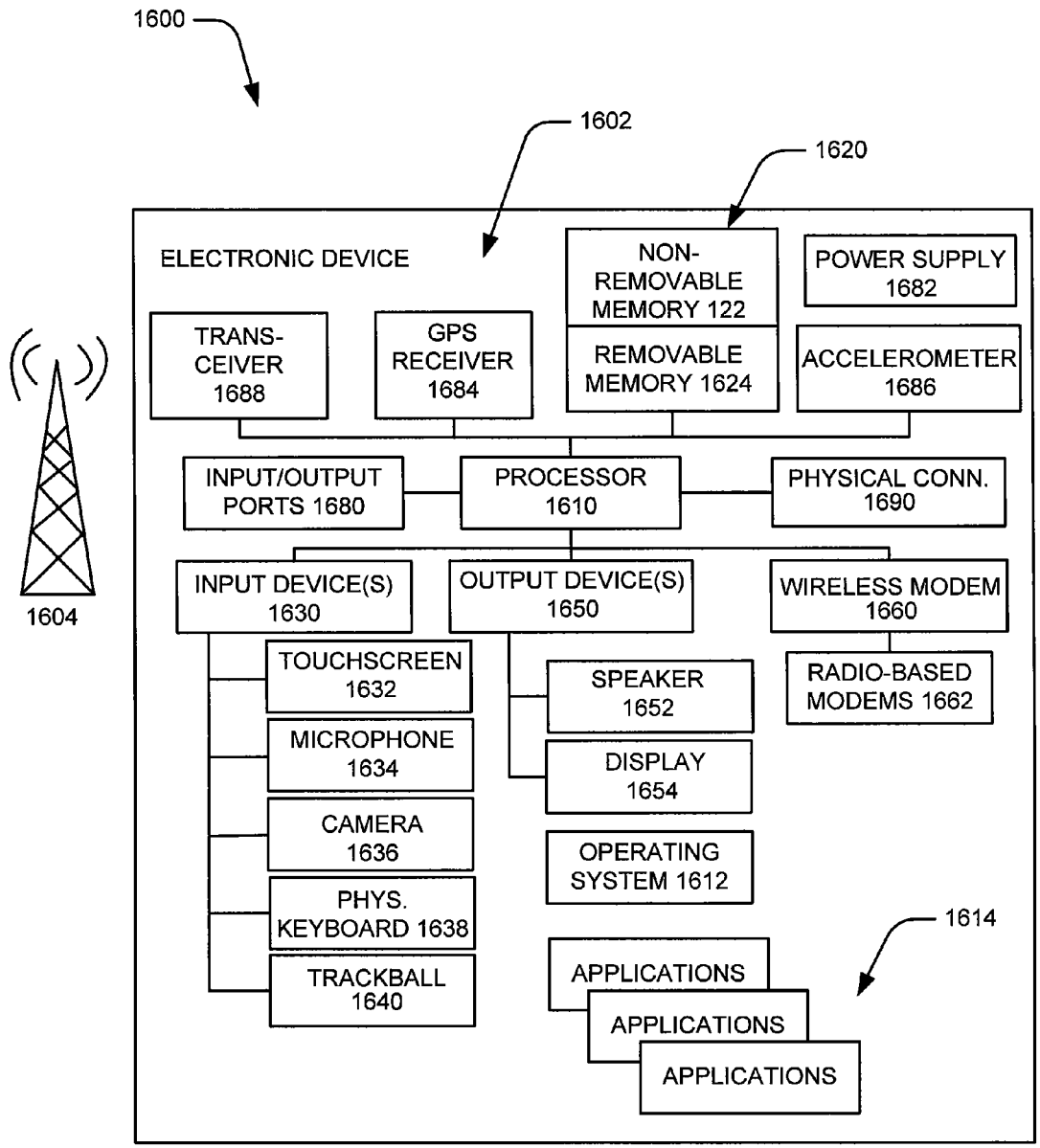
FIG. 16 is a block diagram of an exemplary electronic device for use with one or more of the disclosed technologies.

FIG. 16 shows a block diagram of an exemplary electronic device 1600 that includes a variety of optional hardware and software components, shown generally at 1602. Any of the components 1602 in the device 1600 can communicate with any other component, although not all connections are shown, for ease of illustration. The device 1600 can be any of a variety of devices described herein and in some cases allows wireless two-way communications with one or more mobile communications networks 1604, such as a cellular or satellite network. The illustrated device can include a controller or processor 1610 (e.g., signal processor, microprocessor, ASIC, or other control and processing logic circuitry) for performing such tasks as signal coding, data processing, input/output processing, power control and/or other functions necessary for implementing the device. An operating system 1612 can control the allocation and usage of the components 1602 and provide support for one or more application programs 1614. The application programs 1614 typically include e-mail applications, calendars, contact managers, web browsers, text and media messaging applications. The application programs 1614 also implement embodiments of one or more methods disclosed herein. Memory 1620 can include non-removable memory 1622 and/or removable memory 1624.

The non-removable memory 1622 can include RAM, ROM, flash memory, a hard disk, or other well-known non-transitory memory storage technologies and can be used for storing data and/or code (e.g., computer-executable instructions) for running the operating system 1612 and the application programs 1614. Example data can include web pages, text, images, sound files, video data, test results, test instructions or other data sets transferable to and from one or more network servers or other devices via one or more wired or wireless networks. The removable memory 1624 can include flash memory or a Subscriber Identity Module (SIM) card, which is well known in GSM communication systems, or other well-known memory storage technologies, such as "smart cards." The memory 1620 can be used to store a subscriber identifier, such as an International Mobile Subscriber Identity (IMSI) and an equipment identifier, such as an International Mobile Equipment Identifier (IMEI). Such identifiers can be transmitted to a network server to identify users and equipment.

The device 1600 can support one or more input devices 1630, such as a touch screen 1632, microphone 1634, camera 1636, physical keyboard 1638 and/or trackball 1640 and one or more output devices 1650, such as a speaker 1652 and/or a display 1654. Other possible output devices (not shown) can include piezoelectric or other haptic output devices. A wireless modem 1660 can be coupled to an antenna (not shown) and can support two-way communications between the processor 1610 and external devices, as is well understood in the art. The modem 1660 is shown generically and can include a cellular modem for communicating with the mobile communication network 1604 and/or other radio-based modems 1662 (e.g., Bluetooth or Wi-Fi). The wireless modem 1660 is typically configured for communication with one or more cellular networks, such as a GSM network for data and voice communications within a single cellular network, between cellular networks, or between the device and a public switched telephone network (PSTN). The device can further include at least one input/output port 1680, a power supply 1682, a satellite navigation system receiver 1684 (such as a Global Positioning System (GPS) receiver), an accelerometer 1686, a transceiver 1688 (for wirelessly transmitting analog or digital signals) and/or a physical connector 1690, which can be a USB port, IEEE 1394 port, LAN port, and/or RS-232 port. Further embodiments can include a wired modem (not shown). The illustrated components 1602 are not required or all-inclusive, as any components can be deleted and other components can be added.

In view of the many possible embodiments to which the principles of the disclosed technologies may be applied, it should be recognized that the illustrated embodiments are only examples of the technologies and should not be taken as limiting the scope of the invention. Rather, the scope of the invention is defined by the following claims. We therefore claim as our invention all that comes within the scope of these claims.

We claim:

1. A hinged stand for supporting an electronic device while a lower surface of the electronic device rests on a horizontal support surface and a front planar display of the electronic device is oriented non-parallel with the horizontal support surface, the stand comprising:

a first rigid arm member comprising a first end, a second end, and a longitudinal axis extending between the first end and the second end;

a second rigid arm member comprising a first end and a second end, the first end of the second rigid arm member being pivotally connected to the second end of the first rigid arm member about a pivot axis that intersects the longitudinal axis, wherein the second rigid arm member rests on the horizontal support surface when the stand is coupled to the electronic device with the lower surface of the electronic device resting on the horizontal support surface;

a first connector that extends from the first end of the first rigid arm member in a direction substantially normal to the longitudinal axis of the first rigid arm member, the first connector being configured to electrically and mechanically couple the stand to a side of the electronic device and to provide data to the electronic device, wherein the first rigid arm member extends rearwardly from adjacent a side of the electronic device with the display of the electronic device substantially normal to the longitudinal axis of the first rigid arm member when the side of the electronic device is coupled to the first connector; and a second connector located at or adjacent to the second end of the second rigid arm member, the second connector wirelessly couples the stand to a data source; and wherein the stand is not configured to mechanically connect two electronic devices together.

2. The stand of claim 1, wherein the first connector forms the only area of contact between the electronic device and the stand when the electronic device is coupled to the first connector.

3. An apparatus comprising:

a first member, the first member being mechanically couplable to a non-horizontal edge of an electronic device when the electronic device is resting on a horizontal support surface such that the first member extends from the non-horizontal edge in a rearward direction relative to a frontward facing display of the electronic device; and a second member pivotally coupled to the first member, the second member being configured to engage the horizontal support surface when the electronic device is resting on the horizontal support surface and the first member is mechanically coupled to the non-horizontal edge of the electronic device the first member comprising a first data connector, the first data connector being configurable to electrically couple with a second data connector, the second data connector being electrically coupled to the electronic device, the first and second data connectors provide a wireless exchange of data between the electronic device and a companion electronic device;

wherein the apparatus is not configured to mechanically couple a display portion of the electronic device to a second portion of the electronic device.

4. The apparatus of claim 3, the apparatus being configurable to position the display of the electronic device at two or more viewing angles relative to the support surface.

5. The apparatus of claim 3, the first member being configured, when coupled to the electronic device, to extend along an axis that is generally normal to a plane of a viewing surface of the electronic device.

6. The apparatus of claim 3, the apparatus being configurable, when coupled to the electronic device, to hold the first member above the support surface.

7. The apparatus of claim 3, the non-horizontal edge of the electronic device comprising a generally vertical edge of the electronic device.

8. The apparatus of claim 3, the first data connector comprising one or more wireless communication components.

9. The apparatus of claim 3, further comprising a third member, the third member being mechanically coupled to at least the first member or at least the second member, the third member being configurable to engage the support surface.

10. The apparatus of claim 9, the third member being configured to fold against at least the first member or at least the second member.

11. The apparatus of claim 3, further comprising one or more status indicators.

12. An apparatus for propping up an electronic device, the apparatus comprising:

a first member;

a second member pivotably coupled to the first member about a first pivot axis; and a third member pivotably coupled to the second member about a second pivot axis that is substantially perpendicular to the first pivot axis, third member being foldable about the second pivot axis against the second member;

wherein the apparatus is configurable such that when the first member is coupled to a lateral side surface of the electronic device with a lower surface of the electronic device resting on a horizontal resting surface that is not part of the apparatus, the second and third members are also resting on the horizontal resting surface to support the electronic device at a desired viewing angle relative to the horizontal resting surface, and the first and second pivot axes are substantially parallel to the horizontal resting surface.

13. The apparatus of claim 12, wherein when the first member is coupled to the side surface of the electronic device with the bottom edge of the electronic device resting on the horizontal resting surface, the first member extends rearwardly from the side surface of the electronic device relative to a front display of the electronic device.

14. The apparatus of claim 12, wherein when the first member is coupled to the side surface of the electronic device with the bottom edge of the electronic device resting on the horizontal resting surface, the second pivot axis is closer to the horizontal resting surface than the first pivot axis.

15. The apparatus of claim 12, wherein the third member is foldable about the second pivot axis from a support position, wherein the third member extends generally perpendicularly from the second member to help support the electronic device against the horizontal ground surface, to a folded position wherein the third member is folded against a side surface of the second member.

16. The apparatus of claim 12, wherein the apparatus comprises a component configured to cause the electronic device to run one or more applications when the apparatus is coupled to the electronic device.

17. The stand of claim 1, wherein the first connector extends from the first rigid arm member in a direction substantially parallel with the pivot axis.

18. The stand of claim 3, wherein the electronic device is unitary handheld device selected from a group consisting of a cell phone, a smartphone, a PDA, a portable music or video player, a video game device, an electronic book reader, and a tablet.

* * * * *